Figure 6:
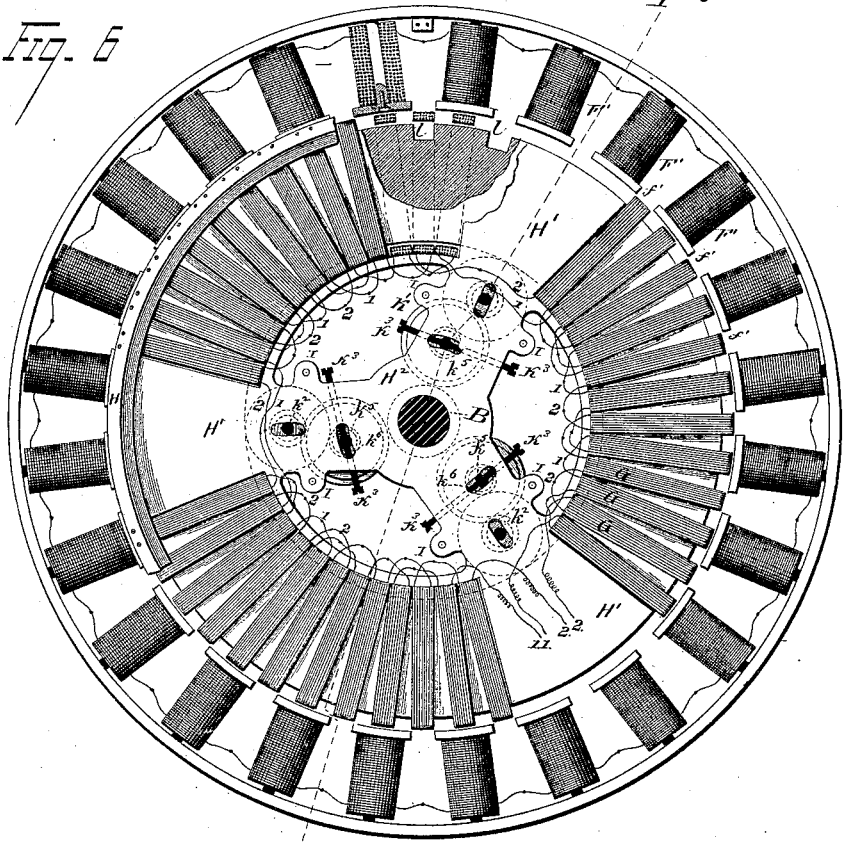

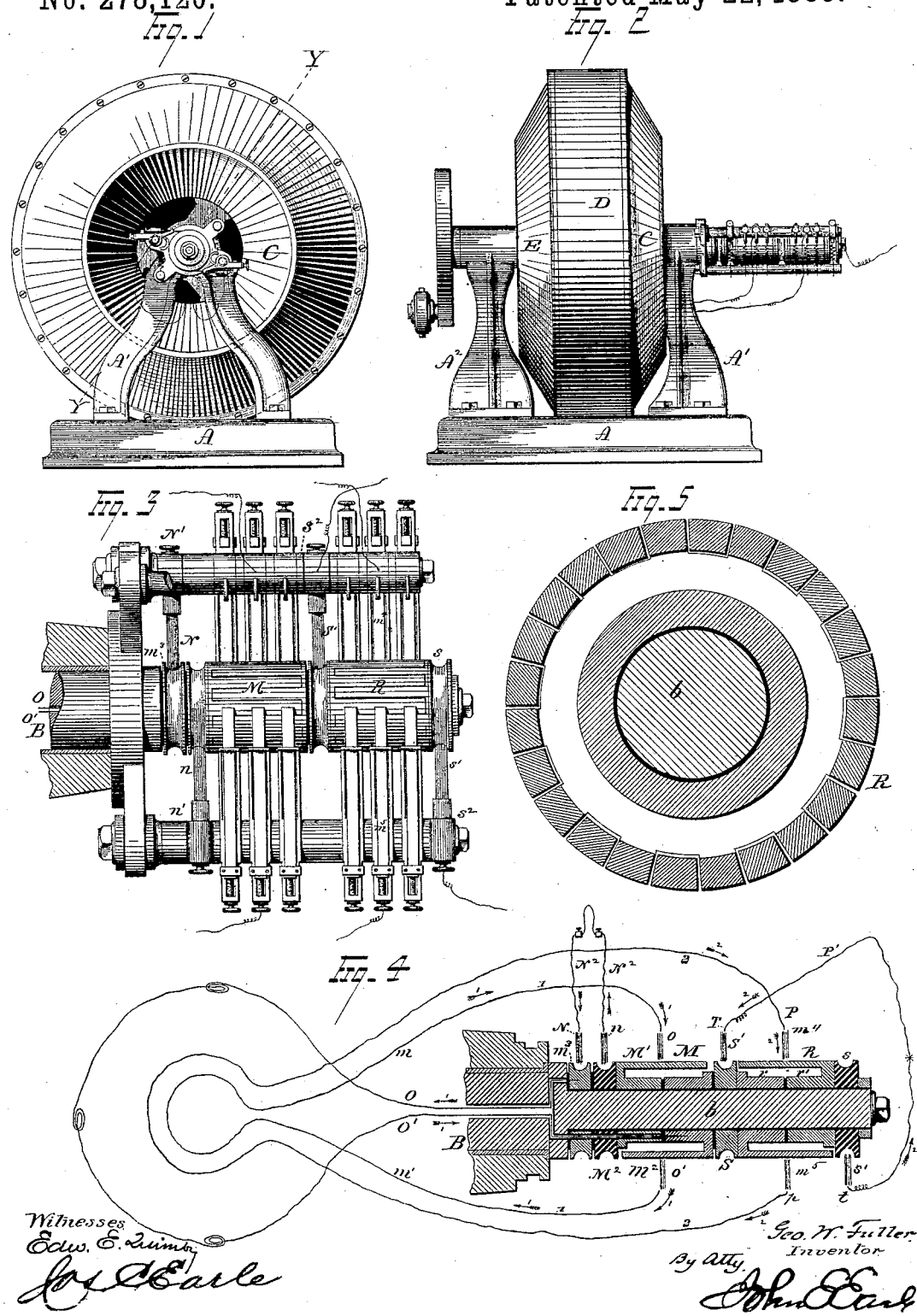

(No Model.) 3 Sheets—Sheet 2.

G. W. FULLER.
DYNAMO ELECTRIC MACHINE.

No. 278,120. Patented May 22, 1883.

Witnesses.

Geo. W. Fuller
Inventor
By atty

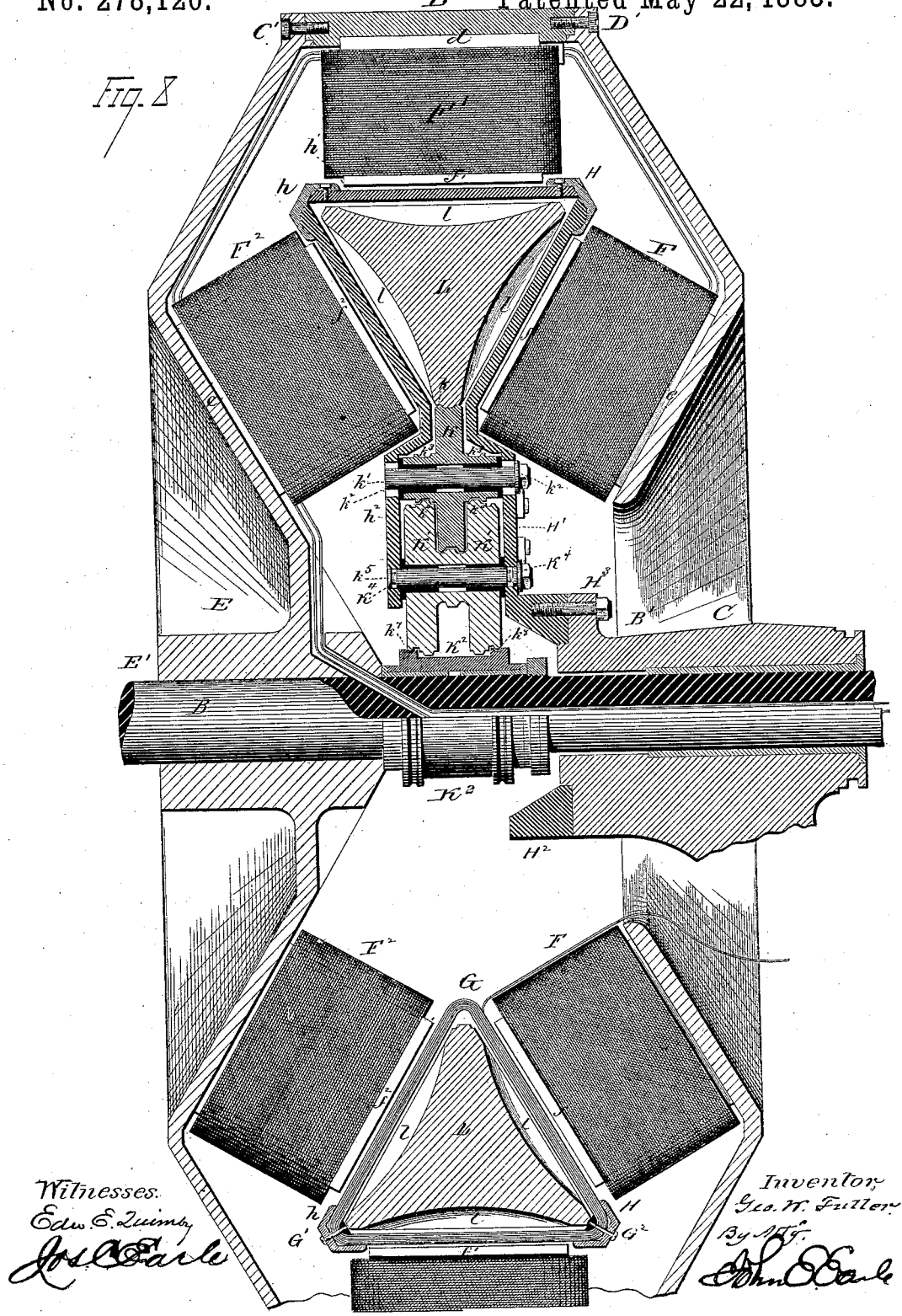

UNITED STATES PATENT OFFICE.

GEORGE W. FULLER, OF NORWICH, CONNECTICUT.

DYNAMO-ELECTRIC MACHINE.

SPECIFICATION forming part of Letters Patent No. 278,120, dated May 22, 1883.

Application filed February 19, 1883. (No model.)

*To all whom it may concern:*

Be it known that I, GEORGE W. FULLER, of Norwich, Connecticut, have invented a certain Improvement in Dynamo-Electric Machines, of which the following is a specification.

My improvements relate to a class of dynamo-electric machines heretofore devised by me, the leading feature of which is that the armature-coil is independent of the coils which surround it, and is maintained in unchanging polar relations with the field-magnets.

In another application, which I have designated "Case A," I have shown and described an application of my invention to an alternating-current machine, the field-magnets of which are charged by an outside machine.

The present case, which I have designated "Case B," exhibits my invention as embodied in a self-charging machine for generating a current or currents of constant polarity. The general features of the machine shown and described in Case A are retained. The field-magnets, which are arranged in radially equidistant groups of three, are affixed to a rotating shell. The armature-core is an endless bar or annulus substantially triangular in cross-section, and is transversely recessed upon its periphery and inwardly-beveled sides in order to form polar prominences upon its faces, corresponding in number and relative positions with the number and relative positions of the poles of the field-magnets. The armature-coils are wound in triangular shape and loosely surround the annular core, and are affixed to a stationary frame. The armature-core is rotated by the magnetic attraction of the rotating field-magnets, and is centralized and supported by three wheels having their bearings in the radial arms of the frame which supports the stationary coils. In this case, however, the weight of the armature-core is supported upon the main shaft of the machine by means of adjustable wheels, which are interposed between a loose wheel on the shaft and three exterior wheels, upon the peripheries of which the inner edge of the armature-core has its bearings. I arrange my stationary coils concentrically in three groups, which are respectively contained in the spaces between the radial arms of the stationary frame. In the accompanying drawings I have shown these coils as connected up in two circuits, each containing an equal number of coils, with two commutators—one for each circuit—one circuit being employed for charging the field-magnets and the other for outside work. Those skilled in the art, however, will at once preceive that a greater or less number of coils may be included in the two circuits shown, or that all of the coils may be connected up in a single circuit, which includes the coils of the field-magnets.

Figure 7:
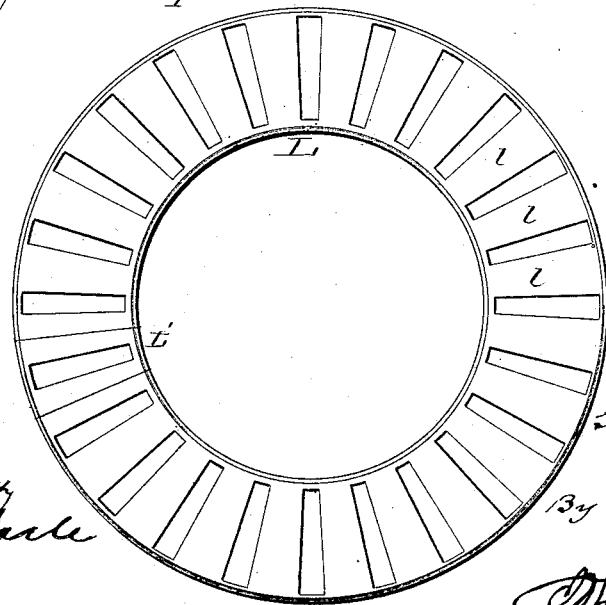

The accompanying drawings, illustrating a constant-current machine embodying my invention, are as follows: Figures 1 and 2 are respectively front and side elevations of the machine upon a small scale. Fig. 3 is a side elevation, upon a larger scale, of the commutators, brush-holders, and brushes. Fig. 4 is a central longitudinal section of the commutators and the end of the shaft upon which the commutators are mounted, together with a diagram illustrative of the circuits. Fig. 5 is a transverse section, upon a still larger scale, of one of the commutators, showing the number and relative location of the different commutator-strips. Fig. 6 is an elevation, partly in section, showing the interior of the machine with the front circle of field-magnets removed. Fig. 7 is a side elevation of the armature-core. Fig. 8 is an axial section through the line Y Y on Fig. 6, showing the principal portion of the rotating shell, and the arrangement of the groups of field-magnets with relation to the annular armature-core and stationary coils, together with the systems of friction-wheels by means of which the weight of the rotating core is supported upon the shaft of the machine and the core is centralized.

The machine is supported upon a substantial base, A, to which are bolted the standards A' A², at the top of which the shaft B of the machine has its bearings.

The rotating shell which carries the field-magnets is composed of three principal parts—viz., the corrugated annular plate C, the short cylinder D, and the annularly-corrugated disk E, provided with a hub, E', which is keyed to the shaft B. The outer edges of the plate C and disk E are secured, respectively, to the opposite ends of the short cylinder D by means of the screws C' and D'. It will be seen that in cross-section the relative angles of the inner faces, $c$, $d$, and $e$, of the shell, to which the three circles of field-magnets F, F', and F² are respectively affixed, are those of the sides of an equilateral triangle. The field-magnets are concentrically arranged in equidistant groups of three, the members of each group occupying the same radial plane.

The armature-coils G, which are stationary and are wound in the form of triangles, are concentrically arranged flatwise in radial planes in three groups, as shown in Fig. 6. The three sides of each stationary coil occupy the most intense parts of the magnetic fields—that is, the parts immediately adjoining the paths of movement of the poles $f$, $f'$, and $f^2$ of the rotating field-magnets. The stationary coils are supported in position by means of the screw-clamps $G'$ $G^2$, which confine the outer corners of the coil to the rings H and $h$, respectively, of the stationary armature-frame composed of the three radial arms $H'$ $H'$ $H'$, the outer portions of which occupy the spaces between the three groups of stationary coils. The radial arms $H'$ are united to a central hub, $H^2$, which is secured by means of the screws $H^6$ to the inner end of the front journal-box, $B'$, of the shaft B. The ring H is secured to the outer edges of the arms $H'$, and the ring $h$ is partially supported in position by being screwed to the rear ends of three suitably-curved plates, $h'$, the front ends of which are secured to the ring H or to the outer ends of the arms $H'$, respectively. Three arms, $h^2$, extend radially inward from the ring $h$ at the three points immediately opposite the arms $H'$, to which the arms $h^2$ are secured by means of suitably-shouldered bolts inserted through the ears I, formed on the sides of the arms $H'$, respectively, and corresponding ears formed on the arms $h^2$. The shape in cross-section of the arms $H'$ and $h^2$ is exhibited in Fig. 8, from which it will be seen that the bends in them are such as to afford clearance on either side for the inner circles of rotating field-magnets F and $F^2$. The arms $H'$ and $h^2$ afford the bearings for the three wheels K K K, having in their peripheries the grooves $k$ for engaging the inner edge of the floating core L, which is an endless bar or annulus substantially triangular in cross-section, and which is segmentally inclosed by the triangular armature-coils G. The core L is provided with a removable section, $L'$, which in the process of putting the machine together is inserted in its place after the triangular coils G have been slipped on the core L. The three faces of the core L are transversely recessed to form the equidistant polar prominences $l$, which correspond in number and relative positions with the number and relative positions of the poles of the field-magnets.

On reference to Fig. 6 it will be seen that the armature-coils G of each group are symmetrically placed, so that when one coil is interposed between the three poles of one group of field-magnets another coil is at the same time interposed between the three poles of the next adjoining group of field-magnets, and so on. The spaces between the members of each group of field-magnets constitute a series of radially-related magnetic fields having an orbital motion by virtue of the rotation around a common center of the magnets by which the fields are excited. The field-magnets are so wound and connected that each field is of the opposite polarity from the fields which adjoin it on either side. The polar prominences upon the faces of the floating core, by reason of their closer proximity to the poles of the field-magnets, are more forcibly attracted than the recessed parts of the core, the result of which is that the core is dragged around by the magnetic attraction of the field-magnets, and the parts of the core where the polar prominences are situated are polarized by induction and retain their respective polarities without change during the operation of the machines.

In the particulars thus far mentioned the construction does not differ essentially from that of the machine described in my Case A; but in the present case the wheels K K K, which afford the bearings for the floating core, are mounted loosely upon their shafts $k'$ $k'$ $k'$. At their ends these shafts have their bearings in the slots $k^2$, formed in the arms $H'$ $h^2$ of the stationary interior frame. The hubs of the wheels K are provided with the grooves $k^3$ for engagement by corresponding tongues, $k^4$, formed upon the peripheries of three intermediate wheels, $K'$, also mounted loosely upon their shafts $k^5$. The shafts $k^5$ have their bearings in the curved slots $k^6$, formed in the arms $H'$ $h^2$. The peripheries of each of the wheels $K'$ are also provided with the additional tongues $k^7$, which engage the grooves $k^8$, formed in the periphery of the central wheel, $K^2$, mounted loosely upon the shaft B. The curved slots $k^6$ are concentric with relation to the shaft B, while the slots $k^2$, in which the shafts $k'$ of the outer series of wheels have their bearings, respectively, are radial with relation to the shaft B. By means of the set-screws $K^3$, inserted transversely through the arms $H'$ $h^2$, and bearing, respectively, upon the bottoms of the grooves $K^4$, formed in the shafts $k^5$ of the adjustable wheels $K'$, those wheels are capable of adjustment in a path which is concentric with the shaft B.

It will be seen that the axes of the adjustable intermediate wheels are not in radial alignment with the axes of the exterior wheels, K K K, and the central wheel, $K^2$, and hence that by moving either of the intermediate wheels, $K'$, laterally toward or away from the radial line which bisects the axis of the central wheel and the axis of that one of the exterior wheels which bears upon the intermediate wheel, the exterior wheel is in the one case forced radially outward from the shaft B, and in the other case is permitted to assume a position nearer the shaft B. By means, therefore, of the three adjustable wheels $K'$ $K'$ $K'$ the annular core can be perfectly centralized and supported in position, while its weight is supported directly upon the shaft B of the machine. The diameters of the systems of wheels are so proportioned that the speed of rotation of the core L is the same as the speed of rotation of the central wheel, K, when that wheel is moving with the shaft B without slipping thereon. The object in having the central wheel loosely mounted is to provide for the slipping of that wheel upon the shaft B when the machine is being stopped, so that there will be no grinding of the bearing-surfaces of the supporting-wheels, such as might be caused by variations in the relative speeds of rotation of the core L and the shell carrying the field-magnets while the machine is coming to rest. The field-magnets are excited by a current derived from any desired number of the stationary armature-coils, which current is rendered constant in polarity by means of a suitable commutator. The remainder of the stationary armature-coils may be employed, either singly or coupled together, to supply a current or currents of alternating polarity to an outside circuit or circuits, or, by means of another commutator, may be made to supply an outside circuit with a current of constant polarity. This is illustrated in the accompanying drawings by a division of the stationary coils into two series, the members of which are coupled together, and form two circuits, one of which supplies the current to excite the field-magnets, while the other supplies an outside circuit.

It will be seen that there are an equal number of stationary armature-coils in each series, and that, regarding the machine as stationary, those of the coils which are in the same radial plane as the field-magnets are included in one circuit, while the remainder of the stationary coils, which occupy the intermediate radial planes, are included in the other circuit. In connecting the stationary coils of each circuit the same method is pursued as in connecting the coils of either of the circles of field-magnets. Thus the first convolution of one coil is connected with the first convolution of the coil immediately preceding it in the series to which it belongs. Its last convolution is connected with the last convolution of the coil next immediately following it in the series, the first convolution of the last-mentioned coil being connected with the first convolution of the next following coil, and so on. For convenience, the interior portion of the circuit which supplies the current for exciting the field-magnets is indicated by the figures 1, while the interior portion of the other circuit is indicated by the figures 2.

It will be seen that the terminal O' of the circuit which includes the coils of the field-magnets is carried through a central hole in the shaft B, and is electrically connected with the part $m^2$ of the commutator M, which is mounted upon the stub end $b$ of the shaft B. The terminal O of the field-coil circuit is led through the shaft B in like manner, and is connected with the contact-wheel $m^3$. The two parts of the commutator M, which are insulated from the shaft and from each other, are each in the shape of a crown-wheel having long rectangular teeth, each having a number of teeth equal to one-half the whole number of groups of field-magnets. The teeth of the crown-wheels forming the two parts of the commutator M are interplaced, the two crown-wheels being insulated from each other in the usual manner. The current for charging the field-magnets is supplied by the circuit No. 1, the two terminals $m$ and $m'$ of which are respectively connected with the brushes $o$ and $o'$, which bear upon opposite sides of the commutator M. One part, M', of the commutator is electrically connected with the contact-wheel $M^2$, the other part, $m^2$, of the commutator being electrically connected, as already stated, with the terminal O' of the circuit which includes the field-coils. If the circuit No. 1 embraces no larger a number of stationary coils than is required for charging the field-magnets, the terminal O may be electrically connected directly with the contact-wheel $M^2$. If, however, the circuit No. 1 furnishes a current which is more than is required for charging the field-magnets, the surplus may be employed in an outside circuit. This is effected by means of the brushes N and $n$ bearing, respectively, upon the contact-wheels $m^3$ and $M^2$. The brushes N and $n$ are respectively sustained by the brush-holders N' and $n'$, which are electrically connected with the terminals of an outside circuit, $N^2$.

The arrows marked 1 on Fig. 4 indicate the complete course of the circuit for charging the field-coils and for supplying the outside circuit, $N^2$.

The terminals P and $p$ of the circuit No. 2, which includes the remainder of the stationary coils, are electrically connected, respectively, with the brushes $m^4$ and $m^5$, which bear upon the periphery of another commutator, R, mounted upon the stub-shaft $b$, and similar in construction to that already described, with the exception that the two parts $r$ and $r'$ of the commutator R are electrically connected, respectively, with the two rotating contact-wheels S and $s$, the grooved peripheries of which make contacts, respectively, with the terminals T and $t$ of the outside or working circuit, P'. The course of the circuit No. 2 is indicated on Fig. 4 by the arrows marked 2.

It will be seen that the poles $f$, $f'$, and $f^2$ of the rotating field-magnets are pieces the areas of which are larger than the cross-section of the cores, and that the widths of the polar prominences upon the armature correspond to the widths of the poles $f$, $f'$, and $f^2$. The object of this construction is to elongate each field in the direction of its path of motion, and thus give more time for each of the alternate inductive actions of the field upon the stationary coils.

I claim as my invention—

1. In a dynamo-electric machine, a system of rotating field-magnets and a rotating armature-core, and stationary armature-coils loosely surrounding the said armature-core, and a commutator in two parts, which are electrically connected, respectively, with the opposite ends of the circuit which includes the coils of the field-magnets, in combination with two commutator-brushes which are electrically connected, respectively, with the opposite ends of a circuit including any desired number of the stationary armature-coils, for the purpose of exciting the field-magnets by a current derived from the said armature-coils, and thus rendering the machine self-charging.

2. In a dynamo-electric machine, in combination with suitably-excited field-magnets and an armature-core, which are rotated, and armature-coils which are stationary, substantially as set forth, a commutator in two parts, which are electrically connected, respectively, with the opposite ends of a circuit including any desired number of the said stationary armature-coils, and two brushes electrically connected, respectively, with the opposite ends of an outside or working circuit.

3. In a dynamo-electric machine, the commutator M, electrically connected, as set forth, with the circuit which includes the coils of the rotating field-magnets, and with a circuit which includes any desired number of the stationary armature-coils G, loosely surrounding the rotating armature-core L, in combination with the commutator R, and contact-wheels S and s, electrically connected by means of the brushes S' and s' with an outside circuit, and the brushes $m^4$ and $m^5$, electrically connected with a circuit including those of the stationary coils G which are not employed to charge the field.

GEO. W. FULLER.

Witnesses:
   JOS. C. EARLE,
   J. H. SHUMWAY.